(12) United States Patent
Turi et al.

(10) Patent No.: US 8,661,968 B2
(45) Date of Patent: Mar. 4, 2014

(54) DEVICE AND METHOD FOR FOAMING A LIQUID FOODSTUFF, IN PARTICULAR, MILK

(75) Inventors: Mariano Turi, Zurich (CH); Heinz Vetterli, Wangen (CH); Michel Loetscher, Kappel (CH)

(73) Assignee: Niro-Plan AG, Aarburg (CH)

( * ) Notice: Subject to any disclaimer, the term of this patent is extended or adjusted under 35 U.S.C. 154(b) by 458 days.

(21) Appl. No.: 12/836,840

(22) Filed: Jul. 15, 2010

(65) Prior Publication Data
US 2011/0014329 A1 Jan. 20, 2011

(30) Foreign Application Priority Data
Jul. 15, 2009 (DE) .......................... 10 2009 033 506

(51) Int. Cl.
*A23L 2/54* (2006.01)
(52) U.S. Cl.
USPC ............................ 99/323.1; 426/231; 426/474
(58) Field of Classification Search
USPC .................................. 426/231, 474; 99/323.1
See application file for complete search history.

(56) References Cited

U.S. PATENT DOCUMENTS 6,099,878 A * 8/2000 Arksey ........................ 426/231
7,527,818 B2 * 5/2009 Dirren ........................ 426/474
8,069,778 B2 * 12/2011 Gierth et al. ................. 99/452
2005/0223911 A1 10/2005 Landolt
2007/0089612 A1 4/2007 Coccia et al.

FOREIGN PATENT DOCUMENTS

| DE | 4445436 | 6/1996 |
|----|---------|--------|
| DE | 602005004032 | 12/2008 |
| DE | 202008016375 | 4/2009 |
| DE | 202008016400 | 4/2009 |
| EP | 0243326 | 10/1987 |
| EP | 1312292 | 5/2003 |
| EP | 1785074 | 10/2010 |
| WO | 2008083941 | 7/2008 |
| WO | 2009077912 | 6/2009 |

* cited by examiner

*Primary Examiner* — Robert A Hopkins
(74) *Attorney, Agent, or Firm* — Volpe and Koenig, P.C.

(57) ABSTRACT

A device for foaming a liquid foodstuff, in particular, milk, including a foaming chamber (5), a foodstuff feed line (4), a steam feed line (7), and an air feed line (8) is provided. The foodstuff, steam, and air feed lines are connected in a fluid-conducting manner to the foaming chamber (5). The air feed line (9) includes an air valve (10) that can be controlled by a control unit (9), and the air valve (10) is an intermittent air valve in which, by use of the control unit (9), at least one state with a high air flow and a state with relatively lower air flow and/or with no air flow can be specified selectively. The control unit (9) and air valve (10) have an interacting construction such that the average air flow of the air valve (10) can be controlled by repeated switching between the at least two states of the air valve (10). The invention further includes a method for foaming the liquid foodstuff.

12 Claims, 1 Drawing Sheet

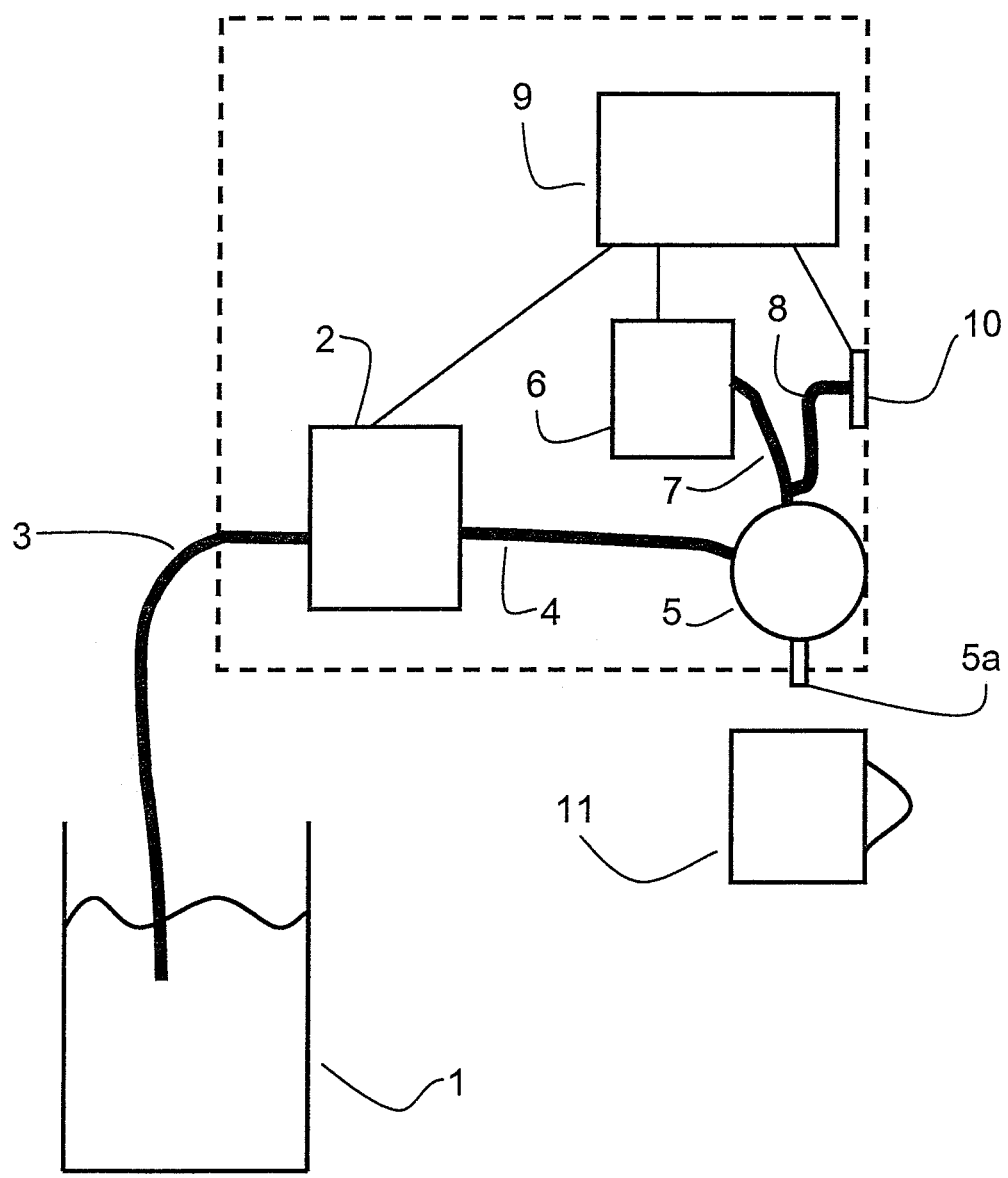

US 8,661,968 B2

DEVICE AND METHOD FOR FOAMING A LIQUID FOODSTUFF, IN PARTICULAR, MILK

CROSS-REFERENCE TO RELATED APPLICATIONS

This application claims the benefit of German Patent Application No. 10 2009 033 506.4, filed Jul. 15, 2009, which is incorporated herein by reference as if fully set forth.

BACKGROUND

The invention relates to a device and to a method for foaming a liquid foodstuff, in particular, milk.

For foaming a liquid foodstuff, devices are known in which steam and air are mixed in a foaming chamber, so that the liquid foodstuff is foamed and can be discharged via an outlet.

In particular, for coffeemakers it is known, for example, for the preparation of a cappuccino, to foam milk with such devices. Typically, the air and/or the milk is suctioned here utilizing the Venturi effect due to the steam flow.

For example, in EP 00 243 326 A2, a device for foaming milk is described in which a milk feed line, a steam feed line, and an air feed line are connected to a foaming chamber. Milk and air are suctioned by means of the Venturi effect due to the steam flow. The device has throttle valves that can be activated by hand for regulating the air flow and the milk flow.

Due to the great popularity of mixed coffee drinks, in particular, mixed coffee-milk drinks, devices for foaming liquid foodstuffs are finding wider and wider use. In particular, in the fine-dining industry there are high requirements on the quality of the foam that is produced. For example, milk foam for cappuccinos should feature a uniformly fine pore size and thus stability. Due to the different types of desired foam and the different starting materials, such as, for example, milk at different temperatures or fat content, as well as other liquid foodstuffs with different viscosity values, the production of the appropriate types of desired foam has proven to be difficult.

SUMMARY

Thus, the invention is based on the objective of creating a device for foaming a liquid foodstuff that simplifies, for the user, the foaming of the liquid foodstuff for the production of a desired foam consistency, in particular, with respect to various mixed foam consistencies, and/or different starting parameters of the liquid foodstuff, such as, for example, temperature, fat content, or viscosity.

This objective is met by a device according to the invention as well as a method according to the invention. Advantageous constructions of the device and the method are described in detail below and in the claims.

The device according to the invention for foaming a liquid foodstuff, in particular, milk, comprises a foaming chamber, a foodstuff feed line, a steam feed line, and an air feed line. The foodstuff feed line, steam feed line, and air feed line are connected in a fluid-conducting manner to the foaming chamber. Here, it lies in the scope of the invention that one or more of the named feed lines are connected to the foaming chamber via additional feed lines.

It is essential that the device comprises a control unit and the air feed line comprises an air valve controllable via the control unit. The air valve is an intermittent air valve, that is, at least one state with high air flow and one state with relatively lower air flow and/or with no air flow can be specified selectively by the control unit. The control unit and air valve have an interacting construction such that the average air flow of the air valve can be controlled through repeated switching between the at least two states of the air valve.

The device according to the invention thus has, for one, the difference to the previously known device that an air valve in the air feed line can be controlled by a control unit. Thus, herewith the air flow can be controlled automatically, so that, for example, a control can be specified easily by the control unit as a function of the starting product and/or the temperature or other parameters of the starting product and/or as a function of the desired type and consistency of the foam to be produced.

Second, the device according to the invention distinguishes itself in that the air flow of the air valve is controlled through repeated switching between at least two states of the air valve. Thus, the air flow is not controlled by a throttle valve, but instead, it is switched repeatedly between at least two states of the air valve with different air flow, so that, on average, the desired air flow is produced.

Studies by the applicant have shown that, in particular, the type of control of the air flow noted above allows a significantly more exact and easier to realize, high-precision control of the desired air flow in comparison with the use of throttle valves. In addition, the "pulsing" of the air flow through the repeated switching between the at least two states of the air valve has a positive effect on the development of foam in the foaming chamber.

Advantageously, the air valve has two states, one essentially closed state and one opened state. Advantageously, the first state is a completely closed state, that is, there is no air flow through the air valve. Depending on the construction or due to the switching times, however, a slight air flow can be realized even for a "closed" state. The average air flow of the air valve is here controlled by repeated switching between the closed and opened states. In particular, the use of solenoid valves is advantageous, because such valves are already available in various embodiments and allow high switching frequencies between the closed and open states.

In one advantageous construction, the control unit and air valve have an interacting construction such that the average air flow of the air valve is controllable by specifying a switching frequency with which it is switched between the at least two states of the air valve and/or by specifying a pulse-duty ratio between the at least two states. The pulse-duty ratio describes the time ratio in which, according to repeated switching, one state of the air valve stands relative to the other states. For only two switching states, the pulse-duty ratio is typically specified in a percentage DC (duty cycle). A pulse-duty ratio of 5% DC thus signifies that, for an air valve with an open and a closed state, on average for 5% of the time period the air valve is opened and for 95% of the time period the air valve is closed.

Studies of the applicant have shown that, in particular, by specifying the pulse-duty ratio, an exact specification of different foam consistencies, in particular, different foam volumes can be achieved for the same total weight of the output foodstuff. Thus, with the device according to the invention, through specifying the pulse-duty ratio by the control unit, the consistency of the generated foam, in particular, the average size of the foam pores can be specified in a way that is reproducible easily and precisely.

Studies of the applicant have shown that advantageously the air valve and control unit are constructed such that, by using the control unit, a switching frequency in the range from 1 Hz to 50 Hz, advantageously in the range from 1 Hz to 20 Hz, further advantageously in the range from 5 to 15 Hz, in particular, a frequency of approximately 10 Hz, can be specified. This is because the typical valves, in particular, solenoid valves, exhibit the best foam results for the specified frequency ranges, in particular, an operation of a solenoid valve at a frequency of approximately 10 Hz is thus advantageous.

As previously mentioned, in particular, the control of a desired foam consistency by specifying the pulse-duty ratio is advantageous. Studies of the applicant have shown that advantageously air valves and control units are constructed such that, by using the control unit, a pulse-duty ratio between the opened and closed states of the air valve can be specified in the range from DC 2% to DC 80%, advantageously in the range from DC 5% to DC 60%. Through the specified ranges, an optimization of the specified value range for the pulse-duty ratio and the change of the foam consistency, in particular, the foam volume as a function of the change of the pulse-duty ratio is produced.

The supply of air is thus performed advantageously by the Venturi effect. For this purpose, the air feed line is advantageously constructed and/or arranged such that, by utilization of the Venturi effect, air can also be fed. Here, it lies within the scope of the invention that the Venturi effect is produced due to the steam flow and/or due to the foodstuff flow and/or the flow of a mixture containing steam and foodstuff.

Likewise, the active air feed line, for example, by a pump, lies in the scope of the invention. The passive air supply by the Venturi effect, however, has the advantage that no additional components are required for the air supply.

Thus, by use the device according to the invention, on one hand, different foam consistencies can be achieved and, on the other hand, specified foam consistencies can be achieved for different starting media at different temperatures and/or viscosity values or other parameters.

Advantageously, the control unit therefore has a programmable construction, so that parameters for the foam production for various beverage products can be stored in the control unit and/or can be specified permanently at the factory. These parameters advantageously comprise one or more parameters from the group of switching frequency, pulse-duty ratio, foaming period, steam quantity, foam quantity, and/or mixed coffee quantity, as well as completion of the beverage preparation, i.e., one or more time points and/or time periods of the addition of the coffee and one or more time points and/or time periods of the addition of the foam. In this way, for different beverage products, the fully automatic completion of its production can be specified, for example, a sequence for the addition of coffee and foam, the appropriate ratios of quantities, as well as the parameters for generating foam. Advantageously, the control unit is therefore also connected to a device for generating coffee, so that the production and/or output of coffee is likewise controllable by the control unit.

Advantageously, the control unit thus comprises a storage unit for storing at least one foaming mode, wherein the foaming mode comprises a switching frequency and/or a pulse-duty ratio. Thus, by specifying a foaming mode, due to the exact control of the air supply, a uniformly constant foaming consistency is guaranteed. Furthermore, for storing several foaming modes, an especially simple production for the user for different foam consistencies and/or use of different liquid foodstuffs or liquid foodstuffs with different parameters is possible. Advantageously, the device therefore comprises an input unit by which the user selects a specified foaming mode, so that the control unit controls the device with the parameters stored for this foaming mode. Alternatively or additionally, it is advantageous that the control unit is connected to at least one detector, for example, for measuring the temperature and/or the fat content of the liquid foodstuff to be foamed. As a function of the measurement data of the detector, in the control unit an allocation to a corresponding foaming mode or foaming modes corresponding to a group are realized, so that a foam with the desired consistency is always guaranteed independent of the user and independent of, for example, temperature and/or fat content of the liquid foodstuff. Likewise, it lies in the scope of the invention that parameters of the liquid foodstuff, such as, for example, temperature, fat content, and the viscosity are input manually by the user by an operation unit and the control unit selects a corresponding foaming mode or a group of corresponding foaming modes.

For the allocation of parameters to a group of foaming modes, the selection of the foaming mode to be used from this group is advantageously performed by the user by the operation unit.

The specification of the foaming modes is advantageously realized at the factory, but the ability for the user to store his own foaming modes or to change existing foaming modes also lies in the scope of the invention.

By controlling the air flow via the control unit and especially the highly precise control for the device according to the invention it is further possible to change the consistency of the foam in a controlled manner during the foaming process. Thus, for example, a foam with a continuously changing consistency, in particular, the average size of the foam pores and/or automatically a layer system made from foam layers with different consistencies, in particular, different average size of the foam pores, can be generated.

Advantageously, therefore, one foaming mode therefore has two different values for the switching frequency and/or the pulse-duty ratio, wherein a time period for its use is allocated to each value pair. Advantageously, for a foaming mode, a constant switching frequency is specified and several pulse-duty ratios changing in steps according to specified time periods or changing continuously. In this way, it is possible to automatically produce foam-layer systems that are interesting visually and in terms of taste.

It lies in the scope of the invention that for the device according to the invention, the liquid foodstuff is suctioned in a known manner utilizing the Venturi effect. Advantageously, however, the device according to the invention comprises a pump for feeding the liquid foodstuff that is connected in a fluid-conducting way on the pressure side to the foodstuff line. As already mentioned, studies of the applicant have shown that for producing a desired foam consistency, an exact specification of the parameters of the foaming process is required. If the liquid foodstuff is fed by a pump, then, in addition to the exact specification of the air flow of the air valve, an exact specification of the fed quantity of milk is also possible, in particular, a more exact specification in comparison with the feeding of milk utilizing the Venturi effect.

In particular, it is advantageous that the control device is connected to the pump and these have an interacting construction such that the supplied quantity of the pump is controllable by the control device. In this way, not only an exact air flow of the air valve, but also an exact feed of the liquid foodstuff, in particular, also a varying supplied quantity, can be specified for a desired foam product.

Studies of the applicant have shown that, in particular, the use of a geared-wheel pump for feeding the liquid foodstuff is advantageous, because, for a geared-wheel pump, the supplied quantity is controllable in an especially reliable manner. Likewise, the use of other pumps lies in the scope of the invention, in particular, oscillating rotor pumps have also proven of good use in the device according to the invention.

Advantageously, a foaming mode therefore also comprises a foaming period for the entire foaming process, in particular, in addition to a foaming period and at least one supplied output of the pump.

For generating steam, the device advantageously comprises a steam generator. Here, it is also especially advantageous when the steam generator is connected to the control unit and has a construction that interacts with this unit such that at least the starting and ending time of the steam addition is controllable. In particular, it is advantageous that the supplied steam quantity is controllable by the control unit. Thus, in this way all of the parameters for the foam production with respect to supplied quantity of the liquid foodstuff, steam supply, and air supply can be specified by the control unit and a desired foam quality is thus reproducible to a high degree.

Advantageously, the foaming mode here also comprises a steam quantity and/or a time period for the steam supply.

Advantageously, the steam feed line opens directly into the foaming chamber.

The air valve is advantageously constructed such that the air flow of the air valve is controllable by electrical control signals.

Advantageously, the device according to the invention comprises a cooling chamber for holding and cooling the liquid foodstuff. In particular, it is advantageous when the device according to the invention is integrated in a known coffeemaker, in particular, a completely automatic coffeemaker.

The construction of the device according to the invention as an accessory for a coffeemaker also lies in the scope of the invention. Here it is advantageous when the device according to the invention comprises a control connection for connecting the control unit to a control unit of the coffeemaker and the control unit is constructed such that, as a function of control signals of the coffeemaker, foam is generated according to the control signals. In this case, the central control is thus performed starting from the coffeemaker that requests foam with a consistency that can be specified by control signals on demand (i.e., as a function of the beverage produced by the coffeemaker). Advantageously, the foam is output by an outlet of the coffeemaker.

The invention further comprises a method for the foaming of a liquid foodstuff, in particular, milk. Here, the liquid foodstuff, steam, and air is fed to a foaming chamber, wherein the air is fed utilizing the Venturi effect due to the steam flow and/or foodstuff flow and/or flow of a steam-foodstuff mixture.

It is essential that an intermittent air valve of the air feed line is switched repeatedly by a control unit between at least one state with high air flow and one state with the relatively lower air flow and/or with no air flow for controlling the average air flow of the air valve.

The resulting advantages correspond to those described above. Likewise, the invention comprises advantageous constructions of the method according to the invention according to the advantageous constructions described above for the device according to the invention.

In particular, it is advantageous that for the method according to the invention, for the regulation of the air valve by the control unit, it is switched repeatedly between an open and an essentially closed state, advantageously by specifying a switching frequency and/or a pulse-duty ratio between the open and closed state of the air valve.

For generating special foam products, it is especially advantageous that during a foaming process, the air flow of the air valve is changed according to a progression specified in the control unit. The liquid foodstuff is advantageously fed by a pump, in particular, the feed rate of the pump is advantageously specified by the control unit.

The method according to the invention is advantageously performed on a device according to the invention or an advantageous construction.

BRIEF DESCRIPTION OF THE DRAWINGS

Additional advantageous features and advantageous constructions of the device according to the invention and the method according to the invention are described below with reference to FIG. 1.

In FIG. 1, an embodiment of a device according to the invention is shown schematically for the foaming of a liquid foodstuff.

DETAILED DESCRIPTION OF THE PREFERRED EMBODIMENT

From a milk container 1, milk is fed by a pump 2 constructed as a gear-wheel pump via a feed line 3. The pump 2 is connected to a foaming chamber 5 via a foodstuff feed line 4.

The device further comprises a steam generator 6 that is connected to the foaming chamber 5 via a steam feed line 7. Opening into the steam feed line 7 there is an air feed line 8, wherein the opening is constructed such that, due to the steam flow, air is suctioned via the Venturi effect from the air feed line and is introduced into the foaming chamber 5.

It is essential that the device has a control unit 9 and the air feed line has an air valve 10 constructed as a solenoid valve. The foam product produced in the foaming chamber 5 is output via an outlet 5a into a container, such as, for example, a cup 11.

The control unit 9 is connected to the air valve 10, the steam generator 6, and the pump 2, so that, through use of the control unit, both the supplied quantity and the feed rate of the liquid foodstuff, as well as the steam quantity and steam flow, and also air quantity and air flow, are controllable in a foaming process.

For this purpose, the control unit 9 comprises a storage unit in which several foaming modes are stored that each comprise a pump supplied output, a specification of the steam flow, and a switching frequency, as well as a pulse-duty ratio for the air valve 10.

Through the use of a (not shown) operation unit, a user can select a desired foam product. The control unit 9 activates the pump 2 and steam generator 6 corresponding to the values of the associated foaming mode and controls these devices corresponding to the specified values. It is also essential that, with reference to the specified switching frequency and the specified pulse-duty ratio, the air valve 10 constructed as a solenoid valve is controlled by the control unit 9, so that an average air flow of the air valve is specified by the control unit.

The air is here suctioned as already described due to the Venturi effect, wherein the air feed line 8 is connected in a fluid-conducting way on one hand to the steam feed line 7 and on the other hand to the air valve 10 and the air valve 10 can be opened relative to the surrounding atmosphere, so that air is suctioned from the surrounding area.

In another foaming mode stored in the storage unit of the control unit 9, two value pairs are specified each for controlling the pump, the steam generator, and the air valve and a time period is also specified for each value pair. If the user selects this foaming mode, then initially for the first specified time period a control according to the first value pair is performed and then for the second specified time period a control according to the second value pair is performed, so that a foam product with two layers with different types of foam is produced.

The invention claimed is:

1. A device for foaming a liquid foodstuff, comprising:
   a foaming chamber, a foodstuff feed line, a steam feed line, and an air feed line,
   the foodstuff, steam, and air feed lines are connected in a fluid-conducting manner to the foaming chamber,
   a solenoid air valve is provided for the air feed line that is controllable using a control unit, and
   the solenoid air valve is an intermittent air valve in which at least one opened state with high air flow and one essentially closed state with at least one of a relatively lower air flow or no air flow is specified selectively by the control unit, and
   the control unit and the solenoid air valve have an interacting construction such that, through repeated switching between the closed and open states of the solenoid air valve, an average air flow of the solenoid air valve is controlled by specifying at least one of a switching frequency in a range from 1 Hz to 50 Hz at which switching is performed between the at least two states of the solenoid air valve or a pulse-duty ratio between the at least two states for production of a specified foam product.

2. The device according to claim 1, wherein the solenoid air valve and control unit are constructed such that a pulse-duty ratio between the opened state and closed state of the solenoid air valve from DC 2% to DC 80% is specifiable by the control unit.

3. The device according to claim 2, wherein the control unit comprises a storage unit for storing at least one foaming mode, and the foaming mode comprises at least one of a switching frequency or the pulse-duty ratio.

4. The device according to claim 3, wherein in the storage unit, the at least one foaming mode includes two different values for at least one of the switching frequency or the pulse-duty ratio, and a time period for its use is allocated to each value or each value pair.

5. The device according to claim 4, further comprising a pump for feeding the liquid foodstuff connected in a fluid-conducting manner on a pressure side to the foodstuff feed line, the control device is connected to the pump and provides an interacting construction, such that a feed quantity of the pump is controllable by the control device, and the pump is a gearwheel pump.

6. The device according to claim 5, wherein in the storage unit, the foaming mode also includes a foaming period for an entire foaming process, and the foaming mode also includes a foaming period and at least one feed output of the pump.

7. The device according to claim 6, further comprising a steam generator that is connected to the control unit and has an construction interacting with the control unit such that the supplied quantity of steam can be controlled by the control unit.

8. The device according to claim 7, wherein in the storage unit, the foaming mode also includes at least one of a quantity of steam or a time period for the steam feed.

9. The device according to claim 8, wherein the air feed line is at least one of constructed or arranged such that air can be fed via the Venturi effect due to at least one of the steam flow, foodstuff flow or flow of a steam foodstuff mixture.

10. A method for foaming a liquid foodstuff, comprising:
    providing a device for foaming the liquid foodstuff, including a foaming chamber, a foodstuff feed line, a steam feed line, and an air feed line and,
    connecting the foodstuff, steam, and air feed lines in a fluid-conducting manner to the foaming chamber,
    providing an air valve for the air feed line that is controlled by a control unit,
    the air valve is provided for the air feed line that is controllable using the control unit, and the air valve is an intermittent air valve in which, the at least one opened state with high air flow and one essentially closed state with at least one of a relatively lower air flow or no air flow that is specified selectively by the control unit, and the control unit and the air valve have an interacting construction such that, through repeated switching between the closed and open states of the air valve, an average air flow of the air valve is controlled by specifying at least one of a switching frequency in a range from 1 Hz to 50 Hz at which switching is performed between the at least two states of the air valve or a pulse-duty ratio between the at least two states for production of a specified foam product and,
    feeding the liquid foodstuff, steam, and air to a foaming chamber, the air being fed by an air feed line having an intermittent air valve, and
    repeatedly switching the air valve using a control unit between at least one state with high air flow and one state with at least one of a relatively lower air flow or no air flow for controlling the average air flow of the air valve to produce a specified foam product.

11. The method according to claim 10, further comprising during a foaming process, changing the air flow of the air valve according to a progression specified in the control unit.

12. The method according to claim 11, further comprising feeding the liquid foodstuff using a pump at a feed rate specified by the control unit.

* * * * *